Patented Dec. 18, 1934

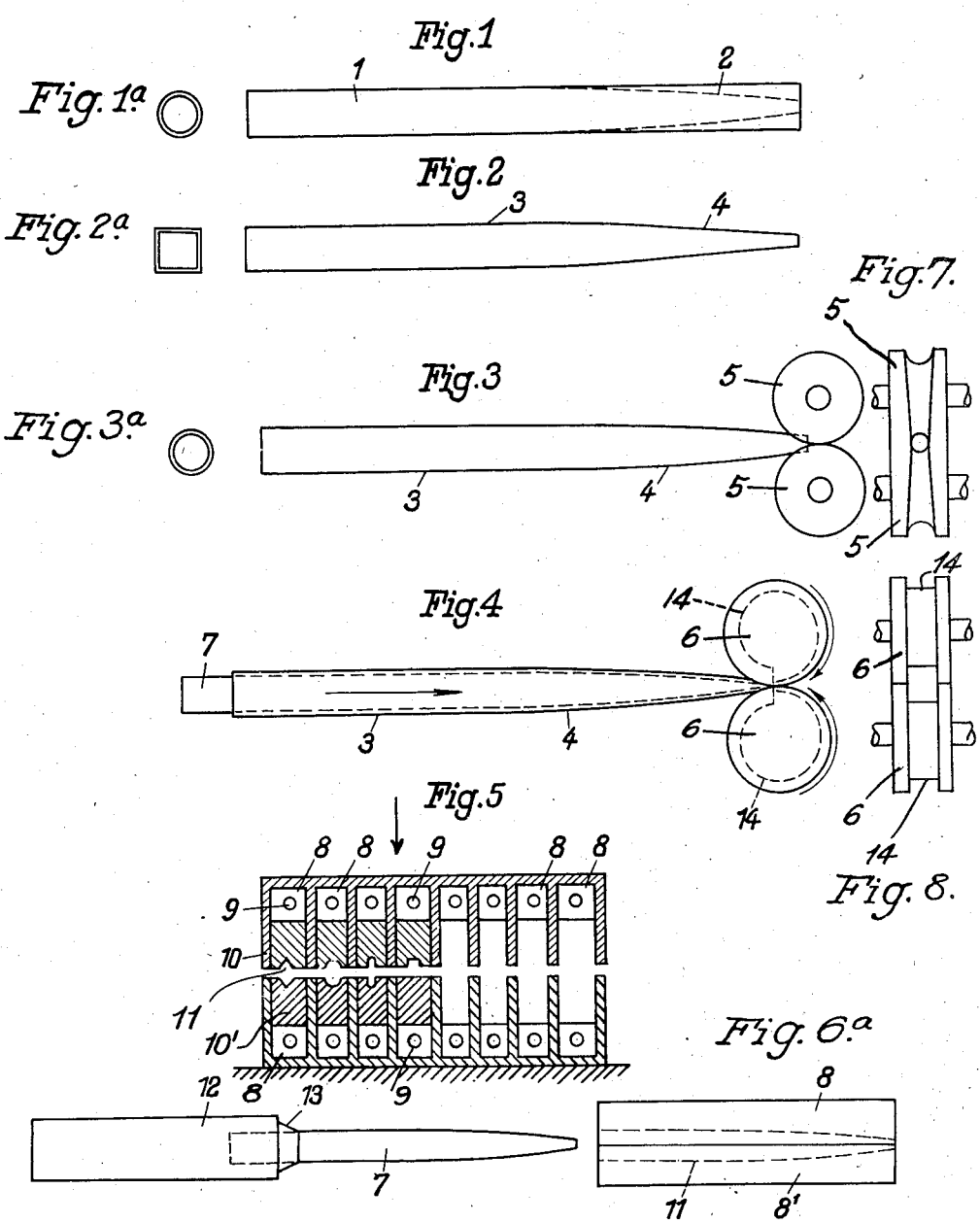

1,985,158

UNITED STATES PATENT OFFICE 1,985,158

METHOD OF FORMING HOLLOW BLANKS FOR FILES AND THE LIKE

Emil Furler, Zurich, Switzerland, assignor to Furler Proceeding Association, Zurich, Switzerland, a firm of Switzerland Application September 26, 1933, Serial No. 691,063 In Germany June 30, 1932

6 Claims. (Cl. 76—24)

The invention relates to a method for the production of thinly walled hollow bodies of malleable metal, such as, for instance, cast steel, wrought iron, malleable cast iron or alloy metal, to be used for the manufacture of files, rasps and the like. The invention further relates to means for carrying out said method.

The files, rasps and the like which have been used hitherto are either made of solid or hollow bodies of steel. But steel, because of its hardness, is difficult to work, for which reason the manufacture of steel tools of this kind (the shaping of the tools as well as the working of the surface of the tools) takes up much valuable time and in addition to that it is difficult and expensive.

When files or rasps are produced from solid bodies of steel no particular difficulty is experienced in providing the files or rasps with the customary profiles and longitudinal cross sections. However, if the files or rasps are to be made from hollow bodies the difficulties become almost insurmountable. Hitherto it has been possible, for such purposes, only to produce hollow bodies of uniform cross section. The cross sections produced have been either of uniform size throughout the whole length of the tool, or uniformly tapered throughout the entire length. It has not been considered possible, however, to produce completely closed hollow bodies having uniform cross sections in one portion of their body and tapering cross sections in another portion, since the steel plate material used for forming the hollow bodies did not permit a perfect union at the contacting edges. To weld the overlapping edges together was not possible, because it would have been injurious to the quality of the material, and since it would have resulted in a recess in the cut of the file at the place where the edges had been welded together. The same would have been the case if the overlapping edges had been riveted together.

It, therefore, has been the custom so far to produce the hollow file bodies from one or several steel sheet strips which at the upper and lower ends were fastened by means of an inserted piece of metal and whose longitudinal edges were not joined together.

But files and rasps of this type have the disadvantage that the steel sheet strips will bend under pressure. Their usefulness is therefore a rather limited one.

The present invention overcomes all of these disadvantages by using soft untempered metal instead of hard steel for the manufacture of the files and rasps, and it is only after the manufacture of the tools has been completed that the tools are subjected to a hardening process. The use of soft untempered material has the advantage that the shaping and the working of the surface of the tool can be carried out without difficulty. It is further not necessary to harden the metal completely to finish the tool. It suffices if the surface of the tool only is hardened. This is preferably done by means of the cementing or face hardening method, which merely provides the surface layer of the tool with the necessary hardness.

The shaping may be done by working a billet of iron into its final shape through cold or hot hammering, rolling or stretching over a mandrel. It is also possible to use thinly walled malleable cast iron, or to produce the hollow bodies in any other suitable way, for instance by means of the metal spraying method or through electrolytic metal deposits. It is only after the shaping has been completed that the surfaces of the hollow body are ground and provided with a file or rasp cut.

The tool can also be produced through winding of an iron band upon a mandril, in which case the edges of the wound up band are either welded together, or joined together in any suitable way to produce a closed and rigid body. The seam may run longitudinally along the tool, or may extend in helical line around the tool in case the winding had been done in spiral fashion.

The tools can also be developed from a piece of pipe. In the latter case the material is stamped from a piece of sheet metal, whereupon the bodies are produced through bending, pressing and welding. It is also possible to use hot or cold drawn pipes cut into suitable lengths.

The pipe-shaped hollow bodies are conically shaped at one end by means of a swaging or forging machine and are conically curved from the middle to one end of the hollow body.

If the preliminary hollow work-pieces have been produced in the aforementioned manner it is difficult to obtain uniform and smooth walls provided with perfectly sharp edges, such as are needed for triangular, quadrangular, semi-circular or like cross-sections, and whereby the cross-sections are of uniform cross-section from the middle to one end of the tool and uniformly tapered from the middle to the other end of the tool.

The difficulty is due to the fact that all of the known machines are unsuitable for hammering, drawing and pressing iron hollow bodies.

The applicant overcomes this difficulty with the aid of a special machine which will hereafter be described. By means of this special machine the prepared hollow work pieces are provided, through rolling, with the desired preliminary form, edges and cross sections. But this preliminary rolling is desirable only for bodies having sharp edged longitudinal surfaces.

It is also possible to produce the desired cross-sections and edges with the aid of a pressing and gauging machine (by means of an inserted mandrel) which preferably should be so constructed that it can be used also for drawing.

In order to prevent the shaping of the bodies resulting in a diminution of the cross section the invention provides the rollers with a curve-shape for instance a spiral-shaped guide-curve, which makes it possible to provide the hollow body throughout its entire length with precisely the shape outlined and determined by the said guide curve. Special exchangeable rollers provided with special curve-shaped guide-grooves are necessary for the rolling of each different form.

After the hollow bodies have been pre-shaped in the aforementioned manner they do not yet possess the smooth and even surfaces and sharp edges which are essential for the manufacture of files. The fact is that it is not possible to produce the desired perfect forms merely through the use of hammering machines and through rolling.

That is why the preliminary raw forms produced in the aforementioned manner are then subjected to a finishing treatment by means of a pressing and gauging machine (by means of an inserted mandrel). This machine preferably consists of an upper and lower pressure head operable for instance by hydraulic means and at a predetermined pressure, wherein the pressure heads are provided with two-part pressure dies, of which a plurality should be arranged side by side for use at the same time.

The two-part pressure dies are provided with one or a plurality of heating elements, consisting of one or more parts and adapted for electrical heating.

The pressure dies should be adapted for exchangeable insertion into the cylinders.

In the above described pressing and gauging machine the preliminary or raw forms are subjected to a scale free heating, which, if necessary may be repeated and during which the hollow raw forms are provided with the exact shape by means of dies and through pressing. In addition to the dies the applicant uses a mandrel adapted in shape to the shape to be produced. Provided at the end of the mandrel is a conical enlargement 13 serving to produce at the end of the hollow tool body a conically enlarged hollow portion for the fastening of the insertable handle.

In certain cases where certain types of shapes have to be produced it may be necessary to subject the longitudinal edges of the hollow bodies to an additional shaping treatment in order to provide the edges with the necessary sharpness. In such cases the hollow bodies (after having been pressed and shaped in the aforedescribed manner) are subjected to an additional rolling treatment, wherein suitably shaped profiled rollers and mandrels are used.

The production of the surfaces of the hollow bodies should preferably be commenced only after the tools have been provided with a perfect shape. The mandrels used during the surface treatment of the hollow bodies must correspond in shape to the shape of the hollow interior of the bodies. Moreover, the mandrels have to consist of first-class wear-resisting material having a hard surface, or must be provided with a surface layer of an alloy of sufficient hardness to permit the formation on the hollow tools of teeth, ribs, grooves or the like by rolling, milling, cutting and the like.

In special cases the shaping and surface treatment may be carried out in one working operation.

The invention will now be explained with the aid of the attached drawing in which Figure 1 is a vertical longitudinal section through an unfinished hollow body having a circular cross section; Fig. 1a is an end view thereof;

Figure 2 is a finished hollow body having a square cross section; Fig. 2a is an end view thereof;

Figure 3 is a diagrammatical illustration of the shaping machine and of a pre-shaped hollow body without mandrel; Fig. 3a is an end view thereof;

Figure 4 is a diagrammatical illustration of the shaping machine provided with profiled rollers, and of the pre-shaped hollow body and mandrel;

Figure 5 shows in vertical cross section an arrangement side by side of a plurality of shapers or dies of the pressing machine;

Figure 6 is a diagrammatical illustration of the pressing and gauging machine with an insertable mandrel. Fig. 6a is a detail view illustrating the dies;

Figure 7 illustrates an edge view of the rollers shown in Figure 3.

Figure 8 illustrates an edge view of the rollers shown in Figure 4.

In Figure 1, a cylindrical hollow body 1 of circular cross section, is adapted in length to the length of the tool to be produced, and which by means of a swaging machine is hammered into conical shape 2 from the middle of the body to one end of it.

Figure 2 shows a finished hollow body 3 having a square cross section and a conically curved end portion 4.

In order to produce the edges and the cross section the pre-shaped hollow bodies are rolled (as illustrated in Figure 3) between two shaping rollers 5 of a special machine (not illustrated in the drawing). In order to produce sharp edges the rollers 6 are provided with milled-in profiles 14, while at the same time a mandrel 7 is used which is adapted in shape to the shape of the tool to be produced. See Figure 4 in which the mandrel 7 is inserted in the hollow body 3.

The pressing of the hollow bodies is done between two pressure tables, an upper one and a lower one, provided with two-part pressure molds. Figure 5 shows the pressure molds arranged on one pressure member. The pressure molds consist of the chambers 8, which are open below and which in their upper portion are provided with the heater elements 9 and in their lower portions with the dies 10. The dies 10 are provided with profiled recesses 11 corresponding in shape to the shape of the recesses in the second pressure member. The hollow bodies are placed in the profiled recesses of the dies and are pressed into shape when both pressure members are pressed against each other.

The heater coils arranged in the upper portions of the pressure molds permit the shaping of the hollow bodies in the heated or glowing condition.

The heater coils may be heated to a temperature of 900° centigrade.

The shaping of the hollow bodies is carried out with the aid of a mandrel. Figure 6 shows a diagrammatic illustration of a mandrel arrangement that may be used for the purpose.

10 is an upper pressure member and 10' a lower pressure member. Arranged before the pressure members is an adjustable slide 12 for holding the mandrel 7. When the slide is moved forward the mandrel 7 is pushed into the recess 11 of the two pressure members 10, 10'. The mandrel 7 is provided with a conical enlargement 13 by means of which the portion of the hollow body 3 which projects from the pressure members is conically enlarged, which conical enlargement later on serves as a means for fastening a handle in the hollow tools.

After the pressure members have been heated to the desired temperature (up to 900° centigrade) the pre-shaped hollow bodies are pushed into them, and as soon as the hollow bodies have been heated to the desired temperature they are pressed into shape by means of the mandrel and the compressing pressure.

The mandrel is introduced into the hollow bodies (by means of the slide) only a moment before the compressing pressure is exercised. That is why the mandrels become only moderately heated.

After the shaping has taken place the slide moves backward, whereby the mandrel and the hollow body are pulled out of the pressure dies. In contact with the open air the thinly walled hollow bodies cool off quickly and press with considerable force upon the less heated mandrels.

In order to remove the hollow bodies from the mandrels without difficulty the slide is again moved forward and the hollow bodies are again pushed to a certain depth into the pressure dies. The hollow bodies then are quickly reheated and, because of the increase in volume, are easily removed from the mandrels.

Because of the side by side arrangement of the plurality of pressure dies in the pressure members the hollow bodies can be treated either singly or in series.

By means of applicant's method it is possible to produce the hollow bodies of files and similar tools in spite of their partly tapered form, with perfectly even surfaces and perfectly sharp edges. This was not possible so far for hollow file bodies of steel.

After the hollow file bodies have received their final shape in the described manner they are pushed on a mandrel of specially alloyed material, which on its surface has been hardened, ground and polished, whereupon the teeth, ribs, grooves or the like are produced through cutting, milling and scratching. The scratching is done by means of suitable scratch brushes.

The last step in the manufacture of the hollow bodies is the hardening step, to which the tools are subjected after the abrasive surface treatment has been completed.

From the foregoing detailed description, it will be seen that the process may be summarized as follows:

First, there is provided a hollow body by any of the well known means and this body in its initial form is usually cylindrical.

Second, the produced body is rolled or otherwise processed to give it the approximate cross sectional shape desired, the cylindrical tube being thus converted to a square, triangular or other desired shape.

Third, the roughly shaped hollow body is subjected to a tapering process or step which may be accomplished by rolling. The body is now roughly of the shape desired in the finished article but is apt to have its edges more or less blunt.

Fourth, a mandrel is inserted in the body and the exterior is subject to a pressing action in dies which gives it its final sharp edged shape.

Fifth, the teeth may now be formed and

Sixth, the body be hardened.

Obviously certain of these steps such as the transverse and longitudinal shaping may be accomplished in one operation.

What is claimed, is:—

1. The method of forming hollow blanks for files and the like which consists in producing a tubular body, rolling said body to approximately the cross-sectional shape of the finished blank, tapering one end of the rolled body, and pressing the body to final form, while simultaneously heating the body.

2. The method of forming hollow blanks for files and the like which consists in producing a tubular body, rolling said body to approximately the cross-sectional shape of the finished blank, tapering one end of the rolled body, and pressing the body to final form on a mandrel while simultaneously heating the body.

3. The method of forming hollow blanks for files and the like which consists in producing a tubular body, rolling the body to approximately the cross-sectional shape of the finished blank and tapering one end thereof, mounting the body on a correspondingly formed mandrel, subjecting the body to a second rolling operation while mounted on said mandrel, and simultaneously heating the body and swaging the body to the dimensions of the finished blank.

4. The method of forming hollow blanks for files and the like which consists in producing a tubular body, rolling the body to approximately the cross-sectional shape of the finished blank and tapering one end thereof, mounting the body on a correspondingly formed mandrel, subjecting the body to a second rolling operation while mounted on said mandrel, and simultaneously heating the body and swaging the body to the dimensions of the finished blank while on the mandrel.

5. The method of manufacturing hollow files and the like which consists in producing an untempered soft tubular body, forging said body to the cross-sectional form of the required blank, tapering one end of the body, reforging the body to the final shape of the blank, cutting teeth on said body, and hardening at least the toothed surface of the body.

6. The method of manufacturing hollow files and the like which consists in producing an untempered soft tubular body, forging said body to the cross-sectional form of the required blank, tapering one end of the body, reforging the body to the final shape of the blank, supporting the formed blank on a mandrel closely fitting therein, cutting teeth on said blank while on said mandrel, and hardening at least the toothed surface of the blank.

EMIL FURLER.